United States Patent
Hwang et al.

(10) Patent No.: US 12,506,140 B2
(45) Date of Patent: Dec. 23, 2025

(54) ANODE ACTIVE MATERIAL FOR LITHIUM SECONDARY BATTERY AND LITHIUM SECONDARY BATTERY INCLUDING THE SAME

(71) Applicant: SK ON CO., LTD., Seoul (KR)

(72) Inventors: Hae Suk Hwang, Daejeon (KR); Sang Han Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 695 days.

(21) Appl. No.: 17/718,251

(22) Filed: Apr. 11, 2022

(65) Prior Publication Data

US 2022/0344637 A1 Oct. 27, 2022

(30) Foreign Application Priority Data

Apr. 22, 2021 (KR) .................... 10-2021-0052386

(51) Int. Cl.
*H01M 4/36* (2006.01)
*H01M 4/02* (2006.01)
*H01M 4/587* (2010.01)
*H01M 10/0525* (2010.01)

(52) U.S. Cl.
CPC .......... *H01M 4/364* (2013.01); *H01M 4/587* (2013.01); *H01M 2004/021* (2013.01); *H01M 2004/027* (2013.01); *H01M 10/0525* (2013.01)

(58) Field of Classification Search
None
See application file for complete search history.

(56) References Cited

U.S. PATENT DOCUMENTS

| 5,340,670 A * | 8/1994 | Takami ................ H01M 4/587 |
| | | 429/231.5 |
| 2016/0322636 A1 | 11/2016 | Lee et al. |
| 2018/0009665 A1* | 1/2018 | Kawaguchi ......... H01M 4/1393 |
| 2018/0342755 A1* | 11/2018 | Yoon .................... H01M 4/587 |

(Continued)

FOREIGN PATENT DOCUMENTS

| KR | 10-1384216 B1 | 4/2014 |
| KR | 10-2015-0134945 A | 12/2015 |

(Continued)

OTHER PUBLICATIONS

Fitch et al. ("Lithium Hydroxide Based Performance Improvements for Nickel Rich NCM Layered Cathode Material", ECS Meeting Abstracts MA2016-02 469, Oct. 2016) (Year: 2016).*

(Continued)

*Primary Examiner* — Niki Bakhtiari
*Assistant Examiner* — James A Corno
(74) *Attorney, Agent, or Firm* — IP & T GROUP LLP

(57) ABSTRACT

An anode active material for a lithium secondary battery according to an embodiment of the present invention includes a first anode active material and a second anode active material, each of which includes a carbon-based active material and has a crystallite size in a range from 50 nm to 60 nm. An XRD orientation ratio of the first anode active material is in a range from 0.9 to 1.2, and an XRD orientation ratio of the second anode active material is in a range from 1 to 5. High-temperature storage and life-span properties are improved while maintaining high capacity using the combination of the first and second anode active materials.

8 Claims, 1 Drawing Sheet

(56) References Cited

U.S. PATENT DOCUMENTS

2019/0363348 A1  11/2019  Kurita et al.
2020/0227746 A1* 7/2020  Wang .................... H01M 4/133

FOREIGN PATENT DOCUMENTS

| KR | 10-2017-0048210 A | 5/2017 |
| KR | 10-1764072 B1 | 8/2017 |
| KR | 10-2020-0064052 A | 6/2020 |
| KR | 10-2132618 B1 | 7/2020 |

OTHER PUBLICATIONS

Office Action for Korean Patent Application No. 10-2021-0052386 issued by the Korean Patent Office on Oct. 29, 2024.
Extended European Search Report for the European Patent Application No. 22167716.4 issued by the European Patent Office on Oct. 5, 2022.

* cited by examiner

ANODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Application No. 10-2021-0052386 filed on Apr. 22, 2021 in the Korean Intellectual Property Office (KIPO), the entire disclosure of which is incorporated by reference herein.

BACKGROUND

1. Field

The present invention relates to an anode active material for a lithium secondary battery and a lithium secondary battery including the same. More particularly, the present invention relates to an anode active material that includes a graphite-based material for a lithium secondary battery and a lithium secondary battery including the same

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A carbon-based material is used as an anode active material of the lithium secondary battery which has preferably high capacity, high power and extended life-span. However, when the anode active material is designed to have high power/capacity composition, thermal and mechanical stability may be lowered, and life-span property and operational reliability of the lithium secondary battery may be deteriorated.

For example, Korean Registered Patent Publication No. 10-1764072 discloses a lithium iron phosphate electrode coated with carbon.

SUMMARY

According to an aspect of the present invention, there is provided an anode active material for a lithium secondary battery having improved capacity and operation reliability.

According to an aspect of the present invention, there is provided a lithium secondary battery having an anode formed of the anode active material.

An anode active material for a lithium secondary battery includes a first anode active material and a second anode active material, each of which includes a carbon-based active material and has a crystallite size defined as Equation 1 in a range from 50 nm to 60 nm. An XRD orientation ratio of the first anode active material is in a range from 0.9 to 1.2, and an XRD orientation ratio of the second anode active material is in a range from 1 to 5. The XRD orientation ratio is defined as I(004)/I(110) which is a ratio of a peak intensity at a (004) plane relative to a peak intensity at a (110) plane.

$$L = \frac{1.84\lambda}{\beta\cos\theta} \qquad \text{[Equation 1]}$$

In Equation 1, L is the crystallite size, $\lambda$ is an X-ray wavelength (nm) used in an XRD analysis, $\beta$ is a full width at half maximum (rad) of the (110) plane, and $\theta$ is a diffraction angle (rad).

In some embodiments, the first anode active material may include natural graphite, and the second anode active material may include artificial graphite.

In some embodiments, the first anode active material may include natural graphite having a sphericity of 0.9 or more.

In some embodiments, the XRD orientation ratio of the second anode active material may be greater than the XRD orientation ratio of the first anode active material.

In some embodiments, the XRD orientation ratio of the first anode active material may be in a range from 0.99 to 1.2.

In some embodiments, the XRD orientation ratio of the second anode active material may be in a range from 2 to 4.

In some embodiments, a weight of the second anode active material may be equal to or greater than a weight of the first anode active material in the anode active material.

In some embodiments, a weight ratio of the first anode active material and the second anode active material may be in a range from 50:50 to 5:95.

A lithium secondary battery includes an anode including the anode active material for a lithium secondary battery according to embodiments as described above, and a cathode facing the anode.

In some embodiments, the cathode may include a lithium-transition metal oxide containing nickel (Ni), cobalt (Co) and manganese (Mn) as a cathode active material. A molar ratio of Ni among Ni, Co and Mn in the lithium-transition metal oxide may be 0.6 or more.

The anode active material for a lithium secondary battery according to exemplary embodiments may include a first anode active material and a second anode active material having crystallite sizes within a predetermined range and different XRD orientation properties. High capacity and life-span stability from the anode active material may be achieved using the combination of the first anode active material and the second anode active material, For example, an improved capacity retention may be obtained by blending of the second anode active material even during repeated charging/discharging at high temperature.

DETAILED DESCRIPTION OF THE EMBODIMENTS

Figure 1:
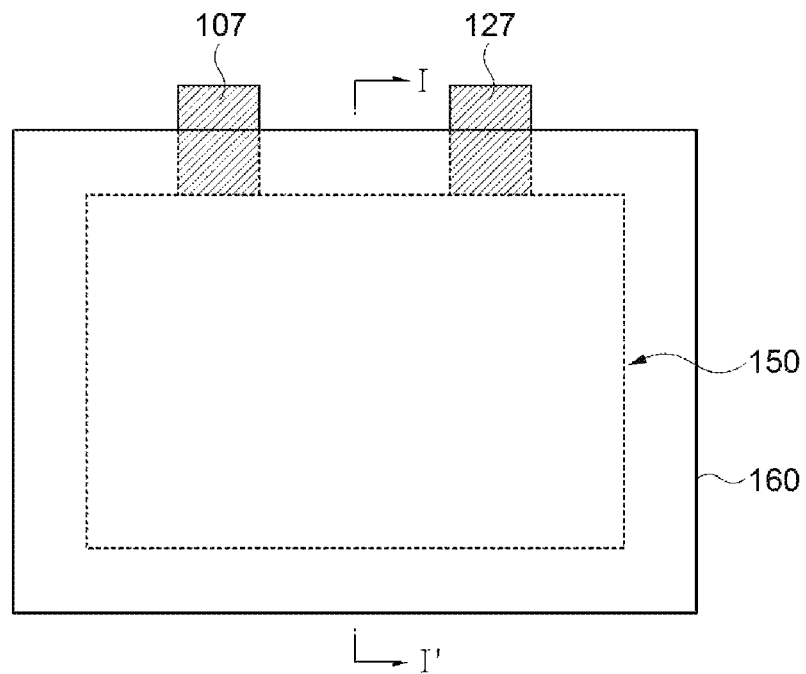
FIGS. 1 and 2 are a schematic top planar view and a cross-sectional view, respectively, illustrating a lithium secondary battery in accordance with exemplary embodiments.

According to exemplary embodiments of the present invention, an anode active material for a lithium secondary battery which includes different types of carbon-based materials and provides enhanced capacity and life-span properties. According to exemplary embodiments of the present invention, a lithium secondary battery including an anode formed of the anode active material is also provided.

Hereinafter, the present invention will be described in detail with reference to exemplary embodiments and the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Anode Active Material For Lithium Secondary Battery

An anode active material for a lithium secondary battery (hereinafter, abbreviated as an anode active material) according to embodiments of the present invention may include different types of carbon-based active materials.

In exemplary embodiments, the anode active material may include a graphite-based material. In some embodiments, the anode active material may include a blend or mixture of natural graphite and artificial graphite.

In example embodiments, a crystallite size of the anode active material may be from 50 nm to 60 nm.

In exemplary embodiments, the "crystallite size" may be a value measured through an X-ray diffraction (XRD) analysis of the anode active material in a powder state. The crystallite size may be calculated by Equation 1 below using a full width at half maximum (FWHM) obtained through the XRD analysis.

$$L = \frac{1.84\lambda}{\beta\cos\theta} \quad \text{[Equation 1]}$$

In the Equation 1 above, L is the crystallite size (nm), $\lambda$ is an X-ray wavelength (nm), $\beta$ is the full width at half maximum (rad) of a corresponding peak, and $\theta$ is a diffraction angle (rad). In exemplary embodiments, the full width at half maximum in XRD analysis for the crystallite size measurement may be obtained from a peak of a (110) plane.

For example, if the crystallite size of the anode active material exceeds 60 nm, capacity retention and life-span properties through the anode active material may be deteriorated. If the crystallite size of the anode active material is less than 50 nm, power and capacity from the anode active material may be excessively reduced.

In some embodiments, the anode active material includes a first anode active material and a second anode active material, and both the first anode active material and the second anode active material may have a crystallite size in a range from 50 nm to 60 nm.

The first anode active material and the second anode active material may have different XRD orientation ratios (or orientation indexes).

The term "XRD orientation ratio or XRD orientation index" used herein may be defined as a ratio of I(004) relative to I(110) (I(004)/I(110)) by the XRD analysis.

I(110) and I(004) are peak intensities or maximum heights of a (110) plane and a (004) plane, respectively, by the XRD analysis of the first anode active material and the second anode active material in powder states.

In exemplary embodiments, the XRD orientation index of the first anode active material may be from 0.9 to 1.2, and the XRD orientation index of the second anode active material may be from 1 to 5.

The XRD orientation index may indicate a crystallinity of the anode active material. For example, when the XRD orientation index is excessively large, exposure of an active surface of the anode active material may become greater, thereby deteriorating life-span properties of the anode or lithium secondary battery. If the XRD orientation index is excessively small, the crystallinity may be degraded, and thus a capacity of the anode active material may also be degraded.

In exemplary embodiments, the mixture of the first anode active material and the second anode active material having different XRD orientation indexes may be used, so that capacity retention and life-span properties may be improved while achieving or maintaining high-capacity properties of the secondary battery.

In some embodiments, the first anode active material may include natural graphite. Natural graphite may have improved power/capacity properties when compared to those from artificial graphite. Therefore, for example, high-capacity properties may be implemented from each of a cathode and the anode of the lithium secondary battery in combination with a high-nickel (High-Ni) cathode composition as will be described later, Natural graphite may have chemical and mechanical stability or durability less than those of artificial graphite. For example, contraction/expansion of natural graphite may occur during repeated charging/discharging, and damages to a particle structure or a crystal structure may be caused.

As described above, natural graphite having the relatively small XRD orientation index may be employed as the first anode active material. Accordingly, the high-capacity properties in the anode may be enhanced by the utilization of natural graphite while compensating for instability of a crystal structure.

In some embodiments, natural graphite particles may be sphere-treated. For example, a plate-like graphite may be pulverized through impact blending or milling. Thereafter, the pulverized graphite powder may be acid-treated using HF, HCl, HNO$_3$, or the like, and then washed. The acid-treated and washed fine particles may be converted into spherical particles through a pressing process.

For example, the XRD orientation index of the first anode active material may be changed according to conditions such as a temperature and a pressure in the acid treatment.

For example, a sphericity of the natural graphite particles may be 0.9 or more, preferably 0.94 or more, and more preferably 0.96 or more.

In some embodiments, the second anode active material may include artificial graphite. Artificial graphite has relatively improved life-span properties compared to those of natural graphite, but may not sufficiently provide high-capacity properties compared to those of natural graphite.

As described above, artificial graphite having the relatively large XRD orientation index may be employed as the second anode active material. Accordingly, capacity stability and life-span properties at high temperature may be enhanced by utilizing artificial graphite, and effects from the combination with the above-described natural graphite may be improved.

Preferably, the XRD orientation index of the first anode active material may be from 0.99 to 1.2, more preferably from 0.99 to 1.1. Preferably, the XRD orientation index of the second anode active material may be from 2 to 4, more preferably from 2.5 to 4.

The second anode active material may include a heat-treated artificial graphite. For example, a powder may be prepared by pulverizing a carbon-based material having an average particle diameter (D50) of 5 μm to 10 μm. Preferably, the powder may be heat-treated at a temperature of 3000° C. or higher to prepare the second anode active material including artificial graphite.

The carbon-based material may include coal-based heavy oil, petroleum-based heavy oil, tar, pitch, cokes, etc.

In an embodiment, the second anode active material may have a secondary particle structure. For example, artificial graphite in the form of primary particles prepared as described above may be mixed with a binder and heat-treated again to obtain the second anode active material having the secondary particle structure.

For example, the XRD orientation index of the second anode active material may be changed according to a temperature and a time of the heat treatment for manufacturing artificial graphite.

According to the above-described exemplary embodiments, the first anode active material and the second anode active material having the different XRD orientation indexes may be used together. Accordingly, while maintaining/enhancing advantages and supplementing/suppressing disadvantageous properties of each anode active material, sufficient capacity and life-span properties may be achieved.

For example, a weight ratio of the first anode active material and the second anode active material in the anode active material (a weight of the first anode active material: the weight of the second anode active material) may be adjusted in a range from 5:95 to 95:5.

In a preferable embodiment, the weight of the second anode active material may be greater than or equal to the weight of the first anode active material to obtain high-temperature storage and capacity retention properties. In an embodiment, the weight ratio of the first anode active material and the second anode active material (the weight of the first anode active material:the weight of the second anode active material) may be adjusted in a range from 50:50 to 5:95.

Preferably, the weight of the second anode active material may be greater than the weight of the first anode active material, and the weight ratio of the first anode active material and the second anode active material (the weight of the first anode active material:the weight of the second anode active material) may be adjusted in a range from 40:50 to 5:95.

Additionally, the crystallite size of the anode active material may be maintained within a range from 50 nm to 60 nm, so that a balance between high power/capacity and life-span properties may be more effectively implemented.

Lithium Secondary Battery

Figure 2:
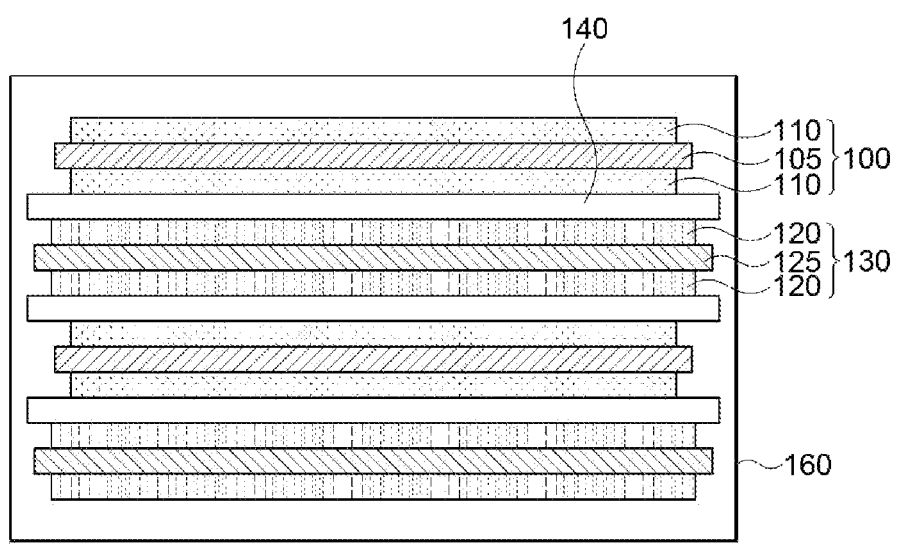

FIGS. 1 and 2 are a schematic top planar view and a cross-sectional view, respectively, illustrating a lithium secondary battery in accordance with exemplary embodiments.

Referring to FIGS. 1 and 2, the lithium secondary battery may include an electrode assembly including a cathode 100, an anode 130 and a separation layer 140 interposed between the cathode and the anode. The electrode assembly may be accommodated and impregnated with an electrolyte in a case 160.

The cathode 100 may include a cathode active material layer 110 formed by coating a cathode active material on a cathode current collector 105. The cathode active material may include a compound capable of reversibly intercalating and de-intercalating lithium ions.

In exemplary embodiments, the cathode active material may include a lithium-transition metal oxide. For example, the lithium-transition metal oxide may include nickel (Ni), and may further include at least one of cobalt (Co) and manganese (Mn).

For example, the lithium-transition metal oxide may be represented by Chemical Formula 1 below.

$$Li_{1+a}Ni_{1-(x+y)}Co_xM_yO_2 \quad \text{[Chemical Formula 1]}$$

In Chemical Formula 1, $-0.05 \leq a \leq 0.15$, $0.01 \leq x \leq 0.3$, $0.01 \leq y \leq 0.3$, and M includes at least one element selected from Mn, Mg, Sr, Ba, B, Al, Si, Ti, Zr and W.

In an embodiment, a molar ratio of Ni among transition metals (e.g., Ni, Co and Mn) included in the lithium-transition metal oxide may be 0.5 or more, preferably 0.6 or more, more preferably 0.8 or more.

In this case, high capacity/power properties may be more effectively implemented through the high content Ni-cathode composition. As described above, the secondary battery capable of stably providing high capacity even in repeated charge/discharge operations may be implemented in combination with the anode active material capable of providing improved extended life-span properties.

A slurry may be prepared by mixing and stirring the cathode active material with a binder, a conductive material and/or a dispersive agent in a solvent. The slurry may be coated on the cathode current collector 105, dried and pressed to form the cathode 100.

The cathode current collector 105 may include, e.g., stainless steel, nickel, aluminum, titanium, copper, or an alloy thereof, preferably aluminum or an aluminum alloy.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

The anode 130 may include an anode active material layer 120 formed by coating a slurry containing the anode active material on an anode current collector 125.

As described above, the anode active material may include a mixture or blend of the first anode active material and the second anode active material having the above-described crystallite size and XRD orientation index.

For example, a slurry may be prepared by mixing and stirring a solvent, a binder, a conductive material, a dispersive agent, etc., with the anode active material according to exemplary embodiments as described above. The slurry may be coated on an anode current collector 125, dried and pressed to form the anode 130.

Materials substantially the same as or similar to those used in the cathode active material layer 110 may also be used. In some embodiments, the binder for forming the anode 130 may include, e.g., an aqueous binder such as styrene-butadiene rubber (SBR) for compatibility with the carbon-based active material, and carboxymethyl cellulose (CMC) may be used as a thickener.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation.

In exemplary embodiments, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding the separation layer 140.

The electrode assembly may be accommodated together with the electrolyte in the case 160 to define the lithium secondary battery. In exemplary embodiments, a non-aqueous electrolyte may be used as the electrolyte.

For example, the non-aqueous electrolyte may include a lithium salt and an organic solvent. The lithium salt may be represented by $Li^+X^-$. An anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, an electrode tab (a cathode tab and an anode tab) may be formed from each of the cathode current collector 105 and the anode current collector 125 to extend to one end of the case 160. The electrode tabs may be welded together with the one end of the case 160 to form an electrode lead (a cathode lead 107 and an anode lead 127) exposed at an outside of the case 160.

FIG. 1 illustrates that the cathode lead 107 and the anode lead 127 protrude from an upper side of the case 160 in a planar view, but locations of the electrode leads are not limited as illustrated in FIG. 1. For example, the electrode leads may protrude from at least one of both lateral sides of the case 160, or may protrude from a lower side of the case 160. Alternatively, the cathode lead 107 and the anode lead 127 may be formed to protrude from different sides of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

1) Preparation Of Natural Graphite Active Material (First Anode Active Material)

Flake-type graphite was put in a continuous grinding classifier to obtain spherical natural graphite, acid treatment was performed at 80° C. for 12 hours using sulfuric acid/hydrochloric acid/nitric acid, and washing and drying were performed to obtain spherical natural graphite with a final purity of 99.8%. The obtained spherical natural graphite had a D50 of 10 μm and an average specific surface area of 10 $m^2/g$.

The spherical natural graphite and pitch were mixed in a weight ratio of 95:5, coating was performed using a blade mill for 30 minutes, and firing was performed using an RHK (roller hearth kiln) in a nitrogen atmosphere at 1200° C. for 12 hours. Thereafter, a first anode active material was obtained through classification and de-iron processes.

2) Preparation Of Artificial Graphite Active Material (Second Anode Active Material)

Cokes was pulverized to a powder, and the powder was heat-treated at 3000° C. for 20 hours to prepare primary artificial graphite particles having an average particle diameter (D50) of 7.5 μm.

The artificial graphite primary particles were mixed with pitch by a weight ratio of 95:5, and heat-treated at 800° C. for 10 hours to prepare secondary particles in which the primary particles were assembled. The average particle diameter (D50) of the secondary particles was 16 μm. Thereafter, a heat treatment was further performed at 3000° C. to prepare artificial graphite secondary particles.

The above-described natural graphite particles and artificial graphite particles were used as anode active material particles in Example 1.

In the above-described manufacturing process, a natural graphite raw material, a sphere-treating condition, a heat treatment temperature and a heat treatment time when preparing the first anode active material were controlled to prepare natural graphite particles having different XRD orientation indexes and crystallite sizes. Further, a type of cokes, pulverization conditions and heat treatment conditions used in manufacturing the second anode active material were controlled to prepare artificial graphite particles having different XRD orientation indexes and crystallite sizes.

An XRD analysis was performed on each of the prepared natural graphite particles and the artificial graphite particles to measure the XRD orientation index (I(004)/I(110)) and the crystallite size according to Equation 1 above.

Specific XRD analysis equipment/conditions are shown in Table 1 below.

TABLE 1

| XRD(X-Ray Diffractometer) EMPYREAN | |
| --- | --- |
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | ¼° |
| Antiscatter slit | ½° |

As shown in Table 2 below, anode active materials for Examples and Comparative Examples including natural graphite (the first anode active material) and/or artificial graphite (the second anode active material) were prepared.

An anode slurry including 93 wt % of the anode active material, 5% by weight of KS6 as a flake type conductive material, 1 wt % of styrene-butadiene rubber (SBR) as a binder and 1 wt % of carboxymethyl cellulose (CMC) as a thickener was prepared. The anode slurry was coated on a copper substrate, dried and pressed to form an anode having an electrode density of 1.65 g/cc.

A slurry was prepared by mixing $Li[Ni_{0.6}Co_{0.2}Mn_{0.2}]O_2$ as a cathode active material, carbon black as a conductive material and polyvinylidene fluoride (PVdF) as a binder in a weight ratio of 96.5:2:1.5. The slurry was uniformly coated on an aluminum foil having a thickness of 12 µm, and vacuum dried at 130° C. to prepare a cathode for a lithium secondary battery.

The cathode and the anode prepared as described above were each notched with a predetermined size, and stacked with a separator (polyethylene, thickness: 25 µm) interposed between the cathode and the anode to form an electrode cell, and each tab portion of the cathode and the anode was welded. The welded cathode/separator/anode assembly was inserted in a pouch, and three sides of the pouch except for an electrolyte injection side were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by forming 1M $LiPF_6$ solution in a mixed solvent of ethylene carbonate (EC)/ethyl methyl carbonate (EMC)/diethylene carbonate (DEC) (25/45/30; volume ratio), and then adding 1 wt % of vinylene carbonate, 0.5 wt % of 1,3-propensultone and 0.5 wt % of lithium bis(oxalato)borate (LiBOB).

Thereafter, a pre-charging was performed for the secondary battery prepared as described above at a current (5A) corresponding to 0.25 C for 36 minutes. After 1 hour, degasing and aging for 24 hours or more were performed, and then formation charge/discharge was performed (charge condition CC-CV 0.2 C 4.2V 0.05 C CUT-OFF, discharge condition CC 0.2 C 2.5V CUT-OFF).

TABLE 2

| | Anode active material | content | XRD orientation ratio (I(004)/I(110)) | Crystallite size (nm) |
| --- | --- | --- | --- | --- |
| Example 1 | First anode active material (natural graphite) | 40 wt % | 1.0 | 59 |
| | Second anode active material (artificial graphite) | 60 wt % | 2.2 | 50 |
| Example 2 | First anode active material (natural graphite) | 10 wt % | 1.1 | 56 |
| | Second anode active material (artificial graphite) | 90 wt % | 2.9 | 50 |
| Comparative Example 1 | First anode active material (natural graphite) | 100 wt % | 1.1 | 57 |
| Comparative Example 2 | Second anode active material (artificial graphite) | 100 wt % | 3.5 | 55 |
| Comparative Example 3 | First anode active material (natural graphite) | 40 wt % | 1.5 | 62 |
| | Second anode active material (artificial graphite) | 60 wt % | 4.2 | 62 |
| Comparative Example 4 | First anode active material (natural graphite) | 40 wt % | 0.8 | 55 |
| | Second anode active material (artificial graphite) | 60 wt % | 1.8 | 55 |
| Comparative Example 5 | First anode active material (natural graphite) | 40 wt % | 1.4 | 55 |
| | Second anode active material (artificial graphite) | 60 wt % | 5.2 | 55 |
| Comparative Example 6 | First anode active material (natural graphite) | 40 wt % | 1.0 | 70 |
| | Second anode active material (artificial graphite) | 60 wt % | 2.2 | 65 |
| Comparative Example 7 | First anode active material (natural graphite) | 40 wt % | 1.0 | 48 |
| | Second anode active material (artificial graphite) | 60 wt % | 4.0 | 49 |

EXPERIMENTAL EXAMPLE

1) DCIR Measurement

The lithium secondary batteries of Examples and Comparative Examples having the anode compositions of Table 2 above were charged/discharged twice (SOC 100%) under conditions of 25° C., 0.5 C, CC-CV. Subsequently, the batteries were charged again under conditions of 0.5 C CC-CV, and 0.5 C discharged until a state of SOC 50%. Thereafter, a voltage (a first voltage) was measured after standing for 30 minutes.

Then, a voltage (a second voltage) was measured after i) 1 C discharging for 10 seconds, and then leaving for 40 seconds, ii) 0.75 C charging for 10 seconds and leaving for 40 seconds. DCIRs were measured using a difference between the first voltage and the second voltage.

2) Evaluation On High Temperature Storage Properties

The lithium secondary batteries of Examples and Comparative Examples having the anode compositions of Table 2 above were charged (CC-CV 1.0 C 4.2V 0.05 C CUT-OFF) and discharged (CC 1.0 C 2.7V CUT-OFF) at room temperature, and set up as a state of SoC100. After standing in a chamber at 60° C., the charging and discharging capacities were measured at an intervals of 4 weeks. After setting up the same state of SoC100 again and standing in the chamber, a capacity retention compared to an initial discharge capacity was calculated at an interval of 4 weeks.

3) Evaluation On 1C/1C Life-Span Properties

The lithium secondary batteries of Examples and Comparative Examples having the anode compositions of Table 2 above were charged (CC-CV 1.0 C 4.2V 0.05 C CUT-OFF) and discharged (CC 1.0 C 2.7V CUT-OFF) 500 times at a chamber of 45° C. A capacity retention was calculated as a percentage of a discharge capacity at a 500th cycle relative to a discharge capacity at a first cycle.

4) Evaluation on 2 C/1 C Life-Span Properties

The lithium secondary batteries of Examples and Comparative Examples having the anode compositions of Table 2 above were charged (CC-CV 2.0 C 4.2V 0.05 C CUT-OFF) and discharged (CC 1.0 C 2.7V CUT-OFF) 500 times at a chamber of 25° C. A capacity retention was calculated as a percentage of a discharge capacity at a 500th cycle relative to a discharge capacity at a first cycle.

The evaluation results are shown in Table 3 below.

TABLE 3

| | DCIR(mΩ) | High-temperature storage property (%) | 1 C/1 C capacity retention (%) | 2 C/1 C capacity retention (%) |
|---|---|---|---|---|
| Example 1 | 1.10 | 90 | 90 | 93 |
| Example 2 | 1.20 | 93 | 95 | 95 |
| Comparative Example 1 | 1.01 | 80 | 81 | 80 |
| Comparative Example 2 | 1.35 | 95 | 96 | 96 |
| Comparative Example 3 | 1.15 | 85 | 85 | 83 |
| Comparative Example 4 | 1.16 | 89 | 87 | 88 |
| Comparative Example 5 | 1.19 | 88 | 89 | 88 |
| Comparative Example 6 | 1.15 | 89 | 88 | 89 |
| Comparative Example 7 | 1.13 | 90 | 88 | 87 |

Referring to Table 3, in Examples where blends of the first and second anode active materials having the above-described ranges of crystallite size and XRD orientation ratio range were used, stable DCIR values and life-span properties were provided.

What is claimed is:

1. An anode active material for a lithium secondary battery, comprising a first anode active material comprising natural graphite, and a second anode active material comprising artificial graphite, each of which comprises a carbon-based active material and has a crystallite size defined as Equation 1 in a range from 50 nm to 60 nm,
wherein an XRD orientation ratio of the first anode active material comprising the natural graphite is in a range from 0.9 to 1.2, an XRD orientation ratio of the second anode active material comprising the artificial graphite is in a range from 1 to 5, and the XRD orientation ratio of the second anode active material is greater than the XRD orientation ratio of the first anode active material, and
the XRD orientation ratio is defined as I(004)/I(110) which is a ratio of a peak intensity at a (004) plane relative to a peak intensity at a (110) plane:

$$L = \frac{1.84\lambda}{\beta\cos\theta} \qquad [\text{Equation 1}]$$

wherein, in Equation 1, L is the crystallite size, $\lambda$ is an X-ray wavelength (nm) used in an XRD analysis, $\beta$ is a full width at half maximum (rad) of the (110) plane, and $\theta$ is a diffraction angle (rad).

2. The anode active material for a lithium secondary battery of claim 1, wherein the first anode active material includes natural graphite having a sphericity of 0.9 or more.

3. The anode active material for a lithium secondary battery of claim 1, wherein the XRD orientation ratio of the first anode active material is in a range from 0.99 to 1.2.

4. The anode active material for a lithium secondary battery of claim 1, wherein the XRD orientation ratio of the second anode active material is in a range from 2 to 4.

5. The anode active material for a lithium secondary battery of claim 1, wherein a weight of the second anode active material is equal to or greater than a weight of the first anode active material in the anode active material.

6. The anode active material for a lithium secondary battery of claim 5, wherein a weight ratio of the first anode active material and the second anode active material is in a range from 50:50 to 5:95.

7. A lithium secondary battery, comprising:
an anode comprising the anode active material for a lithium secondary battery of claim 1; and
a cathode facing the anode.

8. The lithium secondary battery of claim 7, wherein the cathode comprises a lithium-transition metal oxide containing nickel (Ni), cobalt (Co) and manganese (Mn) as a cathode active material, and
a molar ratio of Ni among Ni, Co and Mn in the lithium-transition metal oxide is 0.6 or more.

* * * * *